US008713658B1

(12) United States Patent
Tidd

(10) Patent No.: US 8,713,658 B1
(45) Date of Patent: *Apr. 29, 2014

(54) SYSTEM FOR AND METHOD OF PROVIDING SINGLE SIGN-ON (SSO) CAPABILITY IN AN APPLICATION PUBLISHING ENVIRONMENT

(75) Inventor: William Tidd, Alton Bay, NH (US)

(73) Assignee: GraphOn Corporation, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,742

(22) Filed: May 25, 2012

(51) Int. Cl.
*H04L 29/06* (2006.01)

(52) U.S. Cl.
USPC .............................. 726/8; 713/155; 715/200

(58) Field of Classification Search
USPC ................................ 713/155; 726/8; 715/200
See application file for complete search history.

(56) References Cited

U.S. PATENT DOCUMENTS

| | | | |
|---|---|---|---|
| 7,188,181 B1 * | 3/2007 | Squier et al. ............... | 709/228 |
| 7,222,158 B2 | 5/2007 | Wexelblat | |
| 7,249,175 B1 | 7/2007 | Donaldson | |
| 7,526,792 B2 | 4/2009 | Ross | |
| 7,647,411 B1 | 1/2010 | Schiavone et al. | |
| 8,073,855 B2 | 12/2011 | Nagoya | |
| 8,219,807 B1 | 7/2012 | Danoyan et al. | |
| 8,281,410 B1 | 10/2012 | Sobel et al. | |
| 8,527,978 B1 | 9/2013 | Sallam | |
| 2004/0080771 A1 | 4/2004 | Mihira et al. | |
| 2004/0190049 A1 | 9/2004 | Itoh | |
| 2005/0149857 A1 | 7/2005 | Negishi et al. | |
| 2005/0177730 A1 * | 8/2005 | Davenport et al. ......... | 713/182 |
| 2005/0198299 A1 | 9/2005 | Beck et al. | |
| 2006/0075224 A1 * | 4/2006 | Tao .............................. | 713/164 |
| 2006/0150256 A1 | 7/2006 | Fanton et al. | |
| 2007/0061264 A1 | 3/2007 | Yeung et al. | |
| 2007/0078994 A1 * | 4/2007 | Wilson et al. ............... | 709/229 |
| 2007/0283446 A1 | 12/2007 | Yami et al. | |
| 2008/0209537 A1 * | 8/2008 | Wong et al. ................. | 726/12 |
| 2008/0270516 A1 | 10/2008 | Ragnet et al. | |
| 2009/0024626 A1 | 1/2009 | Takei | |
| 2009/0037976 A1 | 2/2009 | Teo et al. | |
| 2009/0083852 A1 | 3/2009 | Kuo et al. | |
| 2009/0132509 A1 | 5/2009 | Nagoya | |
| 2009/0180777 A1 | 7/2009 | Bernard et al. | |
| 2009/0235347 A1 | 9/2009 | Syed et al. | |
| 2009/0245176 A1 | 10/2009 | Balasubramanian et al. | |
| 2009/0300129 A1 | 12/2009 | Golub | |
| 2010/0058431 A1 | 3/2010 | Mccorkendale et al. | |

(Continued)

OTHER PUBLICATIONS

U.S. Appl. No. 13/367,228 Final Office Action dated Jul. 23, 2013.
U.S. Appl. No. 13/367,228 Office Action dated Jan. 30, 2013.
U.S. Appl. No. 13/367,239 Office Action dated Jun. 24, 2013.
U.S. Appl. No. 13/481,752 Office Action dated May 9, 2013.
U.S. Appl. No. 13/367,239 Final Office Action dated Nov. 14, 2013.
U.S. Appl. No. 13/753,474 Office Action dated Nov. 21, 2013.

*Primary Examiner* — Michael Pyzocha
(74) *Attorney, Agent, or Firm* — Lewis Roca Rothgerber LLP

(57) ABSTRACT

A client-server computing system includes a computer cluster for hosting certain resources, applications, programs, processes, files, and/or data that are published to users who are accessing the computer cluster remotely. The computer cluster includes a network of one or more host computers, a gateway server, a gateway service database, and a user database. A single sign-on (SSO) method of the disclosure includes performing a computer cluster authentication process in which a user enters his/her credentials followed by a resource authentication process in which there is no need for the user to reenter his/her credentials, having entered them already in the computer cluster authentication process.

19 Claims, 7 Drawing Sheets

(56) References Cited

U.S. PATENT DOCUMENTS

| | | |
|---|---|---|
| 2010/0153581 A1 | 6/2010 | Nagarajan et al. |
| 2010/0325716 A1 | 12/2010 | Hong et al. |
| 2011/0029772 A1 | 2/2011 | Fanton et al. |
| 2011/0279829 A1 | 11/2011 | Chang et al. |
| 2011/0314093 A1 | 12/2011 | Sheu et al. |
| 2012/0011578 A1* | 1/2012 | Hinton et al. .............. 726/8 |
| 2012/0023593 A1 | 1/2012 | Puder et al. |
| 2012/0159570 A1 | 6/2012 | Reierson et al. |
| 2012/0297471 A1 | 11/2012 | Smithson |

* cited by examiner

SYSTEM FOR AND METHOD OF PROVIDING SINGLE SIGN-ON (SSO) CAPABILITY IN AN APPLICATION PUBLISHING ENVIRONMENT

TECHNICAL FIELD

Various inventive embodiments disclosed herein relate generally to computer security applications. In particular, embodiments disclosed herein relate to a system for and methods of providing single sign-on (SSO) capability in an application publishing environment.

BACKGROUND

In a client-server computing system, a computer application or program that is running on one computer (i.e., the server) may be accessible to another computer (i.e., the client) over a network, such as over the Internet. The user interface running on the server is exposed and visible to the client. In this way, the client has remote access to the server and the user of the client device can interact with the application that is running on the server. Single sign-on (SSO) capability is a feature that may be beneficial in client-server computing systems. SSO is a method of access control that enables a user to log in once and gain access to the resources of multiple software systems without being prompted to log in again.

In certain client-server computing systems, a web application is used as the gateway into the system. Namely, a web component that is accessible via the Internet is used as the gateway that controls access to the host and to resources installed and running thereon. Using the web application, the user authenticates to the gateway server. If, for example, the gateway server is implemented as an operating system (OS)-specific application, the user authenticates to that OS-specific application. In this example, the OS-specific application may include mechanisms by which the OS may share the user's security context and automatically authenticate the user on other computers that are members of the same domain. However, a drawback of these single sign-on mechanisms is that they do not necessarily work well between a web application and the OS-specific application. Namely, there is no protocol to share user security context between a web application and the OS-specific application. As a result, this scenario will require the user to sign into the web application and then sign in again to access the OS-specific application.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure is a system for and methods of providing single sign-on (SSO) capability in an application publishing environment. Namely, the system and methods allow users to enter credentials one time and then access resources that may be distributed across multiple computers with no further prompting of the user for credentials. The system and methods of the disclosure exhibit numerous advantages over existing systems. In various embodiments, the system and methods provide SSO capability in distributed application environments in which a web application is used as the gateway into the system. Further, the system and methods of the disclosure allow users to sign into a web application and then allow users to authenticate to a native application, such as a native Windows application, on the same directory without reentering credentials, such as username and password.

An SSO method of the disclosure includes performing a computer cluster authentication process in which a user enters his/her credentials followed by a resource authentication process in which there is no need for the user to reenter his/her credentials, having entered them already in the computer cluster authentication process.

Figure 1:
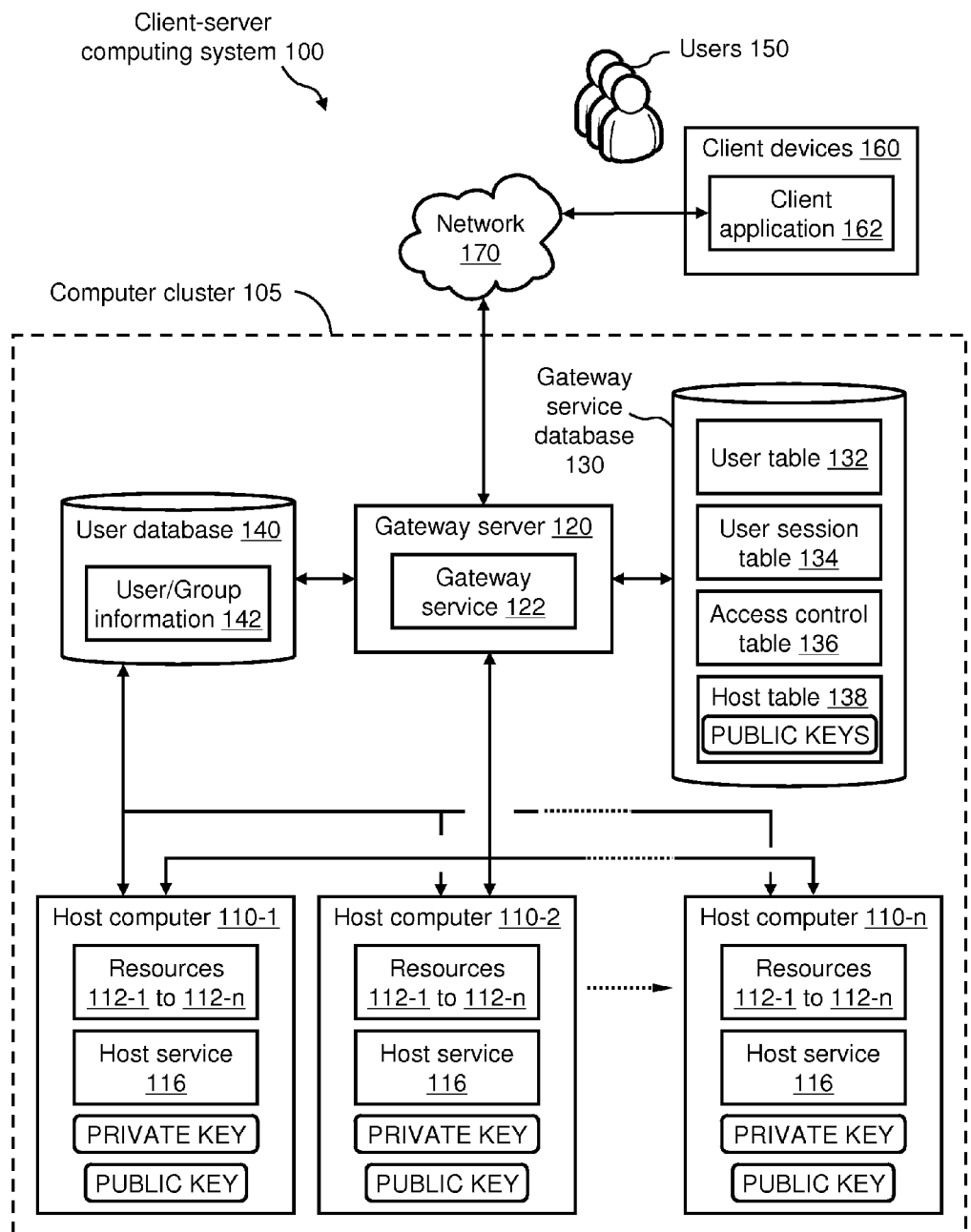
FIG. 1 illustrates a block diagram of a client-server computing system for providing single sign-on capability in an application publishing environment, according to the present disclosure.

FIG. 1 illustrates a block diagram of a client-server computing system 100 for providing single sign-on capability in an application publishing environment. Client-server computing system 100 includes a computer cluster 105 for hosting certain resources, applications, programs, processes, files, and/or data that are published to users who are accessing computer cluster 105 remotely. In one example, computer cluster 105 includes a network of one or more host computers 110, i.e., host computers 110-1 through 110-n; a gateway server 120; a gateway service database 130; and a user database 140. Host computers 110-1 through 110-n may be connected to gateway server 120 and user database 140 via, for example, a TCP connection. The TCP connection may be a standard TCP connection with no encryption or a TCP connection with encryption. One or more users 150 are associated with client-server computing system 100. Users 150 may be individual users and/or groups of users and, thus, hereafter it may be understood that any reference to users 150 means individual users or user groups (i.e., groups of users 150).

Users 150 may access the resources, applications, programs, processes, files, and/or data of computer cluster 105 via client devices 160, which are connected to computer cluster 105 via a network 170. Client devices 160 may be any remote access computing device, such as, but not limited to, any handheld computing device, mobile phone, tablet device, laptop computer, desktop computer, and the like. Network 170 may be, for example, a local area network (LAN) and/or a wide area network (WAN) for connecting to the Internet. Entities of client-server computing system 100 may connect to network 170 by any wired and/or wireless means. Client-server computing system 100 may be implemented using standard client-server architecture between computer cluster 105 and client devices 160.

Each host computer 110 is a computer on which resources, files, applications, programs, and/or processes run on behalf of a given user 150. For example, in a remote access system, such as client-server computing system 100, the "remoting" software is installed and executing (i.e., "running") on each host computer 110, which is software that allows users 150 to remotely access resources, files, applications, programs, and/or processes that are running on each host computer 110. By way of example, a set of resources 112 is installed and running on each host computer 110. Individual instances and/or type of resources, applications, programs, processes, files, and/or data on each host computer 110 is represented by resources 112-1 to 112-n. Examples of individual resources 112 may include, but are not limited to, a word processing application, such as Microsoft® Word; a personal or business finance application, such as Intuit® QuickBooks®; a computer-aided design (CAD) application, such as Autodesk® AutoCAD® and Cadence® Virtuoso®; a medical clinical workflow application, such as Siemens AG Symbia.net™.

Using an example of three host computers 110-1, 110-2, and 110-3, instances of the same or different types of resources 112 may be installed and running on each of the host computers 110-1, 110-2, and 110-3. For example, Microsoft® Word maybe on installed and running on all three host computers 110-1, 110-2, and 110-3. Intuit® QuickBooks® maybe on installed and running on host computers 110-2 and 110-3, but not on host computer 110-1. Autodesk® AutoCAD® maybe on installed and running only on host computer 110-2. Siemens AG Symbia.net™ maybe on installed and running on host computers 110-1 and 110-3, but not on host computer 110-2, and so on.

Each host computer 110 further includes a host service 116. Host service 116 is the application or process that manages the user authentication process at the host computer 110 whenever a resource access request is received from a client device 160 of a certain user 150 via gateway server 120. Additionally, host service 116 provides an application publishing service. Namely, at each host computer 110, host service 116 is used to publish its resources 112-1 to 112-n to users 150. The host service 116 is an application running on each host computer 110 that is capable of starting a remote session in which applications can be run and displayed to a user 150 at client device 160, which is a remote device. The host service 116 application manages the communication of each host computer 110 with the client device 160 with respect to creating and displaying host sessions on behalf of users 150.

Gateway server 120 is used as the gateway into computer cluster 105. Namely, gateway server 120 provides the interface between client devices 160 and host computers 110. As such, resources 112-1 to 112-n of host computers 110-1 through 110-n is delivered to client devices 160 via gateway server 120. More specifically, gateway server 120 includes a gateway service 122. Gateway service 122 is implemented as a web application that is accessible by client devices 160 via, for example, the Internet (e.g., network 170). Gateway service 122 controls access to host computers 110 and any other entities of computer cluster 105. More particularly, under the control of gateway service 122, resources 112 of host computers 110 shall be visible to and accessible by client devices 160 via network 170. For example, users 150 authenticate to gateway server 120 using gateway service 122, which is a web application. Once authenticated, based on access rights and permissions, users 150 are allowed access to resources 112-1 to 112-n of host computers 110-1 through 110-n that are connected to gateway server 120.

In one embodiment, computer cluster 105 is a network of computers that are members of the same domain or directory. Namely, host computers 110 and gateway server 120 are members of the same domain or directory. In another embodiment, host computers 110 and gateway server 120 may be members of different domains or directories as long as the user directory can be accessed from all the computers. For example, if trust relationships exist between the domains.

A client application 162 is an application installed on and executing on each client device 160. Client application 162 provides a user interface to gateway service 122 of gateway server 120. Namely, client application 162 is the component that is the counterpart to gateway service 122 of gateway server 120. Client application 162 may be implemented as a web application and run in a web browser, such as Internet Explorer. However, client application 162 may be implemented by other means, such as a .NET application, a light weight desktop application, a mobile app, and the like.

Gateway service 122 of gateway server 120 is the first process that client application 162 of client devices 160 connects to. The purpose of gateway service 122 is to authenticate users 150 and keep track of what each individual user 150 is allowed to access. Namely, gateway service 122 is used to enforce the access rights and limitations that a system administrator (not shown) has defined. Gateway server 120 stores its own information in a gateway service database 130.

Gateway service database 130 is used for storing access information. For example, the identity of each host computer 110 that a given user 150 is allowed to access is stored on gateway service database 130. Optionally, user/group account information and user/group credentials may be stored in gateway service database 130. However, typically user/group account information and user/group credentials are stored in a separate user database 140, which is accessible to gateway server 120 and all host computers 110, but is generally not accessible to client devices 160. For example, user/group information 142 may be stored in user database 140. A system administrator (not shown) creates and defines user/group information 142. User/group information 142 may contain, for example, account information, user names, group names, user credentials, locations of user/group profiles (e.g., file paths), and the like.

Client-server computing system 100, and more particularly computer cluster 105, may support a cloud computing environment. In a cloud computing environment, gateway server 120 is the cloud server. Further, computer cluster 105 of client-server computing system 100 is not limited to one gateway server 120 only. Computer cluster 105 may include any number of gateway servers 120 (or cloud servers).

A user table 132, a user session table 134, and an access control table 136 are also stored in gateway service database 130. User table 132 contains a list of all users 150 (or groups) that are currently signed into gateway service 122 as well as any users 150 (or groups) that have signed into gateway service 122 in the past. User table 132 is typically populated on demand, as needed. For example, once a user 150 signs in and is authenticated with gateway service 122, a record is created in user table 132. Additionally, a system administrator may create records in user table 132 and may also choose to purge user table 132 at certain times. In this way, user table 132 may contain a partial list of the users in user database 140. Each record in user table 132 contains, for example, the name or other identifying information of a certain user 150 (or group), as well at the user's access rights.

User session table 134 contains a list of sessions of signed-in users 150. Namely, each time a user 150 signs into gateway service 122, a session object is created and stored in user session table 134. The session object is removed from user session table 134 when the user 150 signs out or when the session times out. Access control table 136 that contains the mapping between resources (e.g., resources 112 of host computers 110) that are managed by gateway service 122 and users 150 (or groups) that are allowed to access these resources.

Further, a host table 138 at gateway service database 130 contains a list of all host computers 110 that are registered with gateway server 120. Accordingly, a record for each of the host computers 110 is stored in host table 138. Each record in host table 138 contains, for example, the hostname or host ID and network address. Each record may also include a hardware identifier, such as a media access control (MAC) address, for the certain host computer 110. A public security certificate or public encryption key (PUBLIC KEY) exists for each of the host computers 110. The record in host table 138 for each of the host computers 110 contains its PUBLIC KEY. Additionally, a private encryption key (PRIVATE KEY) exists at each of the host computers 110. The PRIVATE KEY is a secret key for each of the host computers 110 in computer cluster 105. The PRIVATE KEY allows each member of computer cluster 105 to encrypt and decrypt passwords. More details of creating and installing the PUBLIC KEYS and PRIVATE KEYS in computer cluster 105 are described with reference to FIG. 2.

Each gateway service 122 or gateway server 120 must have the capability to encrypt passwords, and each host service 116 of host computers 110 in computer cluster 105 must have the capability to decrypt passwords. Each host service 116 of host computers 100 may also have the ability to encrypt passwords. For example, gateway service 122 of gateway server 120 encrypts a password and then passes the encrypted password to a certain host computer 110. Host service 116 of the host computer 110 then decrypts the encrypted password. In another example, host service 116 of the host computer 110 encrypts a password and stores it in gateway service database 130 and, at a later time, accesses and decrypts the password to authenticate a user 150. An encryption algorithm (not shown) that is used to perform the encryption and decryption is running on each computer in computer cluster 105. An example of an encryption algorithm is the RSA encryption algorithm (RSA is the Security Division of EMC Corporation (Bedford, Mass.)).

In operation, a system administrator sets up and controls the resources 112 and host computers 110 that each user 150 (or group) may access. User and group information is stored in the user database 140. Optionally, user and group information is stored in a separate database, such as in an active directory database (not shown) or in gateway service database 130.

A user 150 accesses computer cluster 105 via his/her client device 160. For example, using a web browser of client device 160, user 150 may initiate client application 162. In so doing, client device 160 connects to gateway service 122 of gateway server 120. Using the web browser, client application 162 prompts the user 150 to enter his/her credentials. For example, the user 150 is prompted to enter a username and password. Having entered the correct username and password, the user 150 is authenticated and connected to computer cluster 105 and has access to resources therein based on access rights and permissions that have been previously determined and stored in the user/group information 142 of the specific user 150. More details of a method of performing computer cluster authentication are described with reference to FIG. 4.

Upon the successful authentication of the user 150 onto computer cluster 105, gateway service 122 of gateway server 120 immediately reuses the credentials of user 150 and authenticates user 150 on one of the host computers 110 of computer cluster 150. Gateway service 122 then erases from memory the credentials of user 150. Next, any resource 112 that has been published to user 150 is displayed to the user 150 via client application 162 and gateway service 122 of gateway server 120. Next, user 150 attempts to access or view a certain resource 112, such as Microsoft® Word, within computer cluster 105. Gateway service 122 of gateway server 120 determines on which one or more of the host computers 110 the Microsoft® Word application resides and directs the access request to a certain one of the host computers 110. Then, a process of resource authentication is performed using host service 116 of the given host computer 110 and using gateway service 122 of gateway server 120, wherein the user 150 is authenticated to the host computer 110 without being prompted to reenter his/her credentials. In this way, a single sign-on function is accomplished within computer cluster 105 of client-server computing system 100, which is the application publishing environment.

By contrast, a drawback of conventional systems is that they either a) require a user to enter his/her credentials when first accessing the computer cluster, and then they require the user to reenter credentials each time a resource on a certain host is accessed or b) require a user to cache his/her credentials in a database or file and thereby create a security vulnerability. More details of a method of performing resource authentication without the need for a user to reenter his/her credentials are described with reference to FIGS. 5 and 6.

Figure 2:
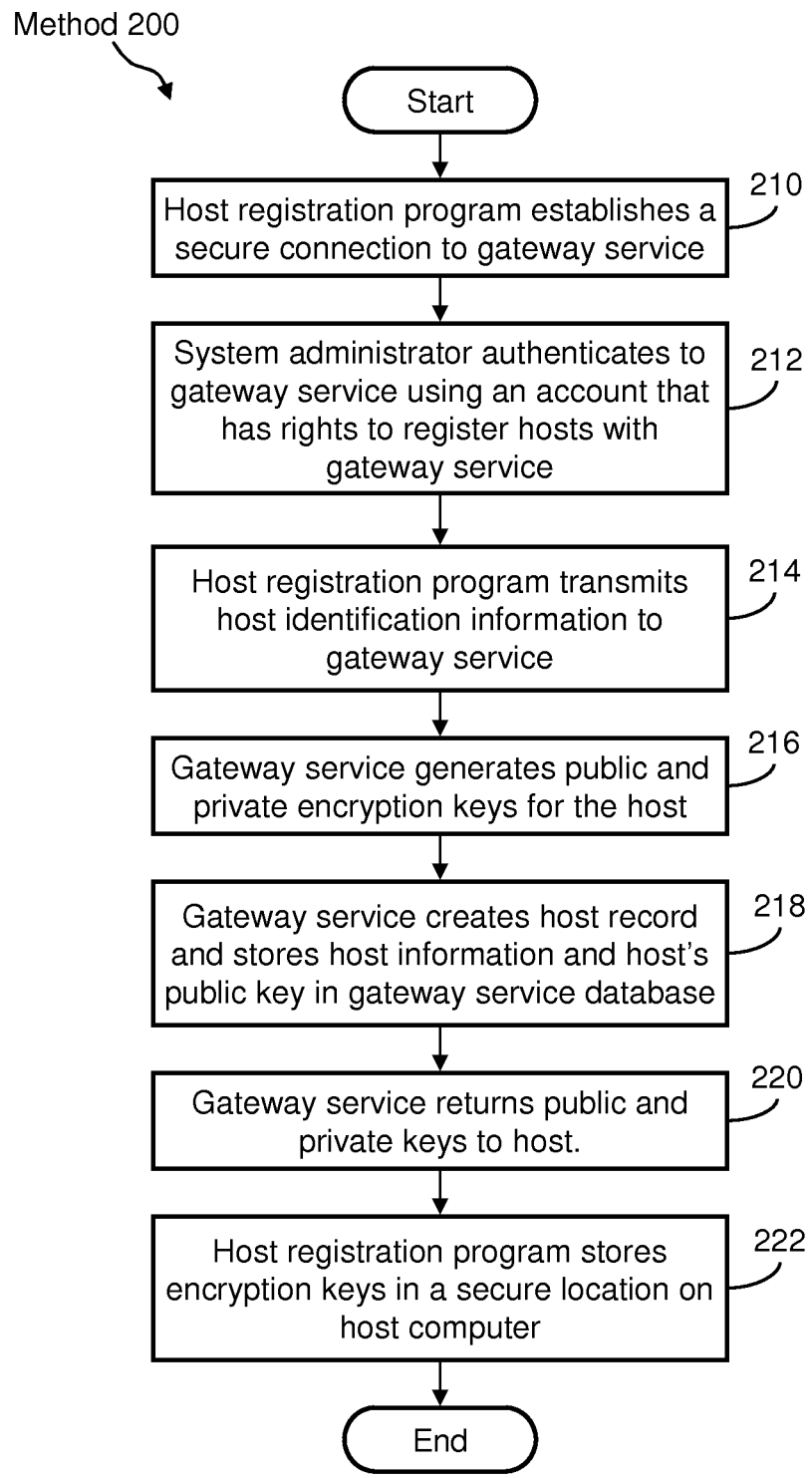
FIG. 2 illustrates a flow diagram of a method of registering a computer on a computer cluster of the client-server computing system, according to the present disclosure.

FIG. 2 illustrates a flow diagram of a method 200 of registering a host computer 110 on computer cluster 105 of client-server computing system 100. In order to allow access to any host computer 110 using gateway service 122, each of the host computers 110 is registered with gateway service 122 when its host service 116 is installed. In so doing, each host computer 110 must identify itself to gateway service 122 and establish credentials by which it may connect to gateway service 122. In this way, it is reliably ensured that the host computer 110 is connected to gateway service 122 and vice versa. Accordingly, with respect to the SSO aspect of the disclosure, method 200 provides a means by which any host computer 110 and gateway service 122 can reliable identify each other. Further, method 200 is used to generate and store the encryptions keys, which are used to exchange credentials (e.g., username and password) during the SSO process. The encryptions keys are critical to maintaining the integrity of the SSO process. Method 200 may include, but is not limited to, the following steps.

At step 210, a host registration or setup program (not shown) of a given host computer 110 establishes a secure connection to gateway service 122 of gateway server 120. For example, the secure connection may be a secure sockets layer (SSL) connection. In this example, gateway service 122 has an SSL certificate installed thereon that identifies the service. The SSL certificate is the means by which the host service 116 of the certain host computer 110 is ensured it is communicating with gateway service 122 of gateway server 120 and not some other service.

At step 212, a system administrator authenticates to gateway service 122 using an account that has rights to register host computers 110 with gateway service 122. More specifically, after gateway service 122 identifies itself to the system administrator using its SSL certificate at step 210, the system administrator that has rights to register the host computer 110 enters his/her credentials (e.g., username and password), thereby identifying himself/herself to gateway service 122.

At step 214, the host registration or setup program (not shown) of the certain host computer 110 transmits information that identifies the host computer 110 to gateway service 122 of gateway server 120. This information may include, for example, the hostname, network address, and MAC address of the host computer 110, which uniquely identifies the host computer 110. This information is stored in host table 138 and is used in host authentication processes, such as the process described with reference to FIG. 3.

At step 216, gateway service 122 generates the public and private encryption keys (i.e., PUBLIC KEY and PRIVATE KEY) for the host computer 110. For example, the PUBLIC KEY and PRIVATE KEY may be generated as SSL certificates. Gateway service 122 is a certificate authority, which allows it to generate public and private encryption keys for any host computer 110 connecting thereto. As such, during any host authentication process (see FIG. 4), gateway service 122 can verify that the SSL certificate from the host computer 110 was generated by gateway service 122. Optionally, gateway service 122 may accept certificates from other certificate authorities.

At step 218, gateway service 122 creates a host record in host table 138 of gateway service database 130. Stored in this record is a unique identifier for the host (a host ID), the host information (e.g., hostname, network address, and MAC address) provided in step 214, as well at the PUBLIC KEY generated in step 216.

At step 220, gateway service 122 returns the PUBLIC KEY and PRIVATE KEY, along with the host ID, to the host computer 110.

At step 222, the host registration or setup program (not shown) of the certain host computer 110 stores the PUBLIC KEY and PRIVATE KEY in a secure location on the host computer 110. For example, the PUBLIC KEY and PRIVATE KEY are stored in a directory of the host computer 110 that only a system administrator can access. In addition, the host ID is stored on the host computer 110.

Figure 3:
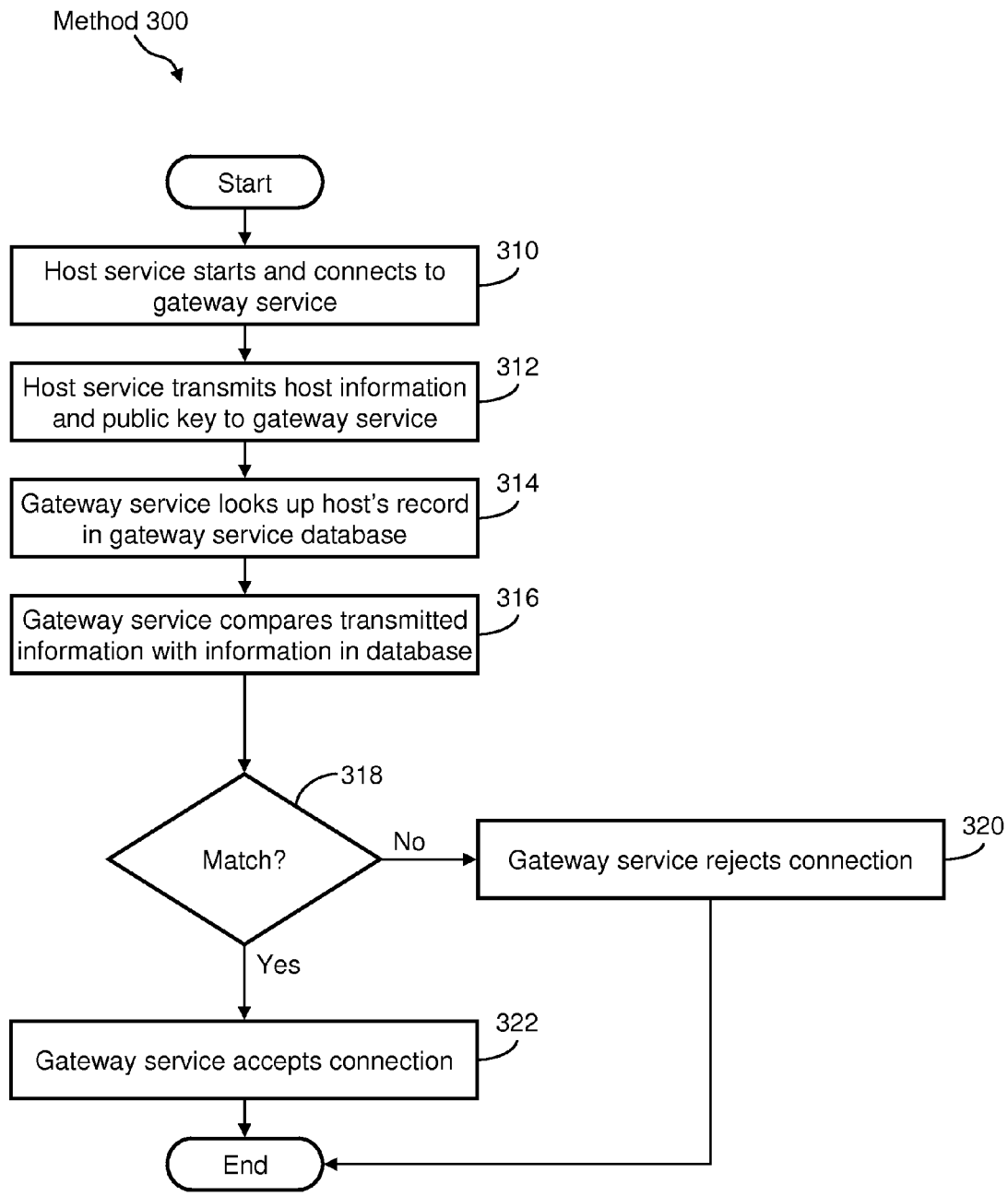
FIG. 3 illustrates a flow diagram of a method of bringing a host computer online within the computer cluster of the client-server computing system, according to the present disclosure.

FIG. 3 illustrates a flow diagram of a method 300 of bringing a host computer 110 online within computer cluster 105 of client-server computing system 100. By way of example, in the steps of method 200, host computer 110-2 is the host computer of interest. Method 300 may include, but is not limited to, the following steps.

At step 310, host service 116 of host computer 110-2 starts and connects to gateway service 122 of gateway server 120. The connection to gateway service 122 may be, for example, an SSL connection or a TCP connection.

At step 312, host service 116 of host computer 110-2 transmits the host ID, host-specific information and its PUBLIC KEY to gateway service 122, thereby providing unique identifying information to gateway service 122. For example, host service 116 transmits the hostname and/or host ID, network address, and MAC address of host computer 110-2 along with the PUBLIC KEY of host computer 110-2 to gateway service 122.

At step 314, gateway service 122 queries host table 138 of gateway service database 130 for the host record that corresponds to host computer 110-2.

At step 316, gateway service 122 authenticates host computer 110-2 by comparing the information received in step 312 with information stored in host table 138 of gateway service database 130. For example, gateway service 122 compares the hostname or host ID, network address, MAC address, and PUBLIC KEY received in step 312 to the information about host computer 110-2 that is stored in host table 138. Gateway service 122 also verifies that the PUBLIC KEY was issued by a trusted certificate authority.

At decision step 318, gateway service 122 determines whether the information received in step 312 matches the information about host computer 110-2 that is stored in host table 138 of gateway service database 130. If the information matches, method 200 proceeds to step 320. However, if the information does not match, method 200 proceeds to step 322.

At step 320, gateway service 122 accepts the connection and host computer 110-2 is connected to gateway service 122 of gateway server 120. Once connected, host computer 110-2 is online within computer cluster 105 and its resources 112 are visible to users 150.

At step 322, gateway service 122 rejects the connection and host computer 110-2 is not online within computer cluster 105. Consequently, host computer 110-2 and its resources 112 are not visible to users 150. Optionally, if the connection fails, method 300 may return to step 310 and host service 116 of host computer 110-2 tries again to connect.

Figure 4:
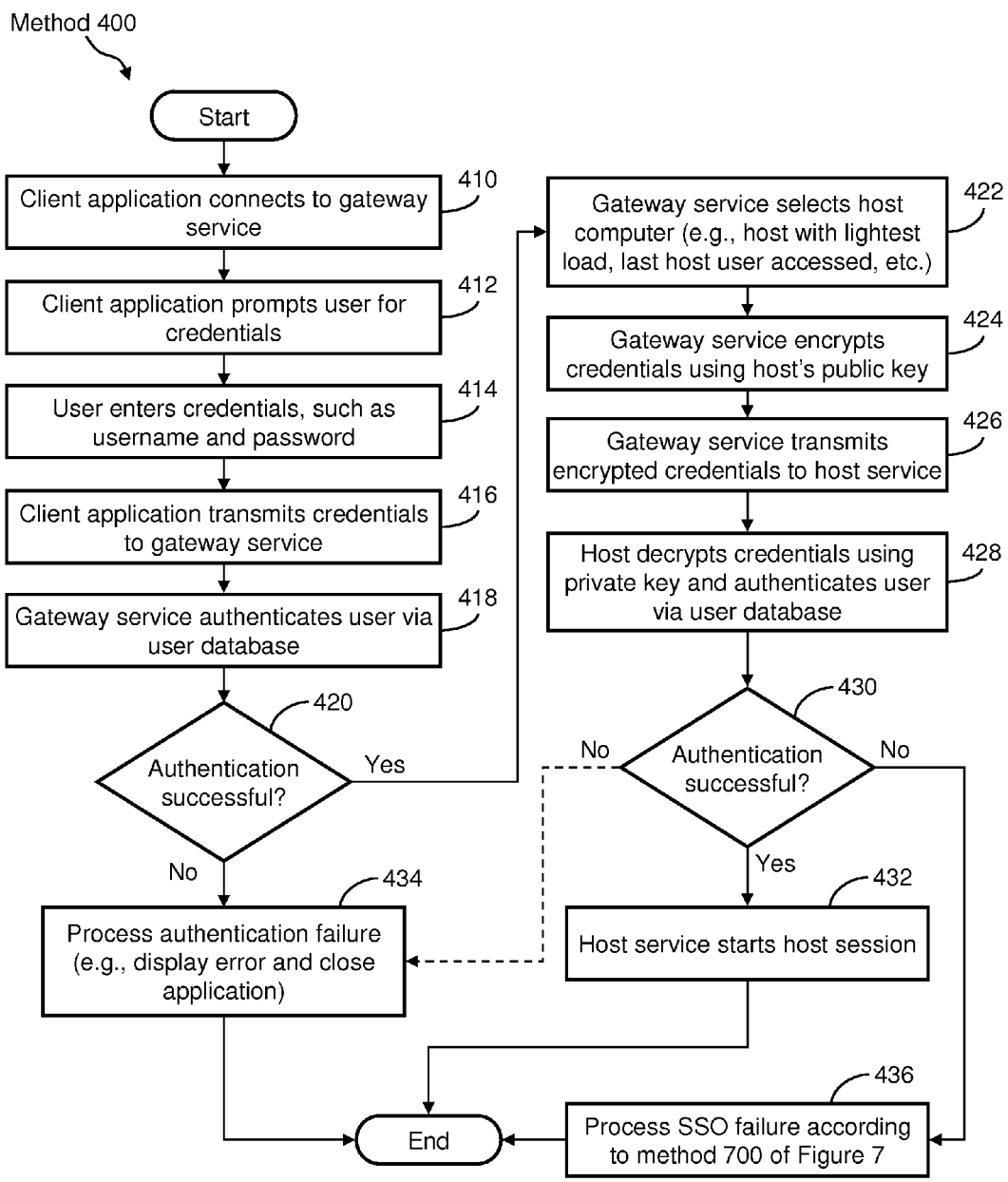
FIG. 4 illustrates a flow diagram of a method of performing computer cluster authentication, according to the present disclosure.

FIG. 4 illustrates a flow diagram of a method 400 of initiating computer cluster authentication; namely, of initiating the SSO process. Method 400 may include, but is not limited to, the following steps.

At step 410, client application 162 of client device 160 connects to gateway service 122 of gateway server 120. For example, a particular user 150 starts up client application 162 on his/her client device 160. Using a web browser, the user 150 enters the address (e.g., URL, IP address, a name that resolves to the IP address, etc) of gateway server 120 and opens a secure (e.g., SSL) connection to gateway server 120. If using a desktop application, the connection may be automatically established to gateway server 120 when the application is started. In any case, gateway service 122 of gateway server 120 is exposed to client device 160 via client application 162. In the case of multiple gateway servers 120, there may be a load balancer to balance the connection to any one of the gateway servers 120.

At step 412, once the connection is established, client application 162 prompts user 150 for credentials. For example, if the user 150 is connected using a web browser, the browser loads in the sign-on application from gateway server 120. The sign-on application prompts the user 150 for his/her credentials, such as a username and password. If the user 150 is connected using a desktop application installed on client device 160, the desktop application may automatically establish the connection and then prompt the user 150 for username and password.

Computer cluster 105 of the disclosure is not limited to a particular form of credentials. A username and password is just one example. Other authentication inputs may be used. For example, a multi-step process may be used, such as enter username and password, then prompt for a personal identification number (PIN); or enter username and password, then gateway server 120 transmits an SMS to the user 150's cell phone that includes a PIN# that the user 150 subsequently enters.

At step 414, using client application 162 of client device 160, the user 150 enters his/her computer cluster 105 credentials, such as his/her username and password.

At step 416, client application 162 of client device 160 transmits the credentials to gateway service 122 of gateway server 120.

At step 418, gateway service 122 authenticates user 150 against information in user database 140 or in gateway service database 130. For example, gateway server 120 calls to user database 140 to authenticate the user 150. However, if gateway service 122 is configured to use gateway service database 130, the user 150 is defined in gateway service database 130 and, therefore, gateway service 122 performs the authentication against the information in gateway service database 130. For security reasons, a user's actual credentials, such as actual username and password, are not stored in any database. Instead, a hash value of the credentials is stored.

At decision step 420, it is determined whether the computer cluster authentication is successful. Namely, whether the credentials entered by the user 150 match the credentials for that user 150 in user database 140 or in gateway service database 130. If the authentication is successful, then method 400 proceeds to step 422. However, if the authentication fails, then method 400 proceeds to step 434.

At step 422, gateway service 122 selects a certain host computer 110. For example, gateway service 122 selects a host computer 110 that has the lightest load (i.e. lowest CPU utilization) or selects the last host computer 110 that the user 150 accessed in a previous session on the computer cluster 105. In one example, gateway service 122 selects host computer 110-1.

At step 424, gateway service 122 encrypts the credentials the user 150 entered in step 414 using the PUBLIC KEY of the selected host computer 110. Continuing the example, gateway service 122 encrypts the credentials using the PUBLIC KEY of host computer 110-1. Gateway service 122 uses any standard encryption algorithm that is appropriate for encrypting sensitive data, such as the RSA encryption algorithm.

At step 426, gateway service 122 transmits the encrypted credentials to host service 116 of the selected host computer 110. Continuing the example, gateway service 122 transmits the encrypted credentials to host service 116 of host computer 110-1. The transmission of the encrypted credentials may be, for example, over an SSL connection or TCP connection, both of which are suitably secure because the credentials can only be decrypted by an entity that has the PRIVATE KEY.

At step 428, host service 116 of the selected host computer 110 decrypts the credentials of user 150 and authenticates the user 150 via information in user database 140. Continuing the example, host service 116 of host computer 110-1 authenticates the user 150 via information in user database 140.

At decision step 430, it is determined whether the host authentication is successful. Namely, whether the credentials user 150 used to authenticate to gateway service 122 are acceptable to host computer 110. If the authentication is successful, then method 400 proceeds to step 432. However, if the authentication fails, then method 400 proceeds to step 436. Optionally, if the authentication fails, then method 400 proceeds to step 434.

At step 432, host service 116 of the selected host computer 110 starts a host session for the user 150. Continuing the example, host service 116 of host computer 110-1 starts a host session for the user 150. The result is an identified session at host computer 110-1 in which the user 150 is authenticated. Optionally, the host session that is started is only a partially constructed host session, in which certain processes may be deferred until actually needed.

At step 434, the authentication failure is processed. In one example, client application 162 of client device 160 and/or gateway service 122 notifies the user 150 of an error and then client application 162 is closed. In another example, client application 162 and/or gateway service 122 prompts user 150 to try again to enter credentials that are valid on the host computer 110. For example, method 400 may return to step 414 and reiterate through steps 414, 416, 418, and 420. User 150 may be allowed a certain number of attempts (e.g., 4 attempts) before client application 162 is closed.

Figure 7:
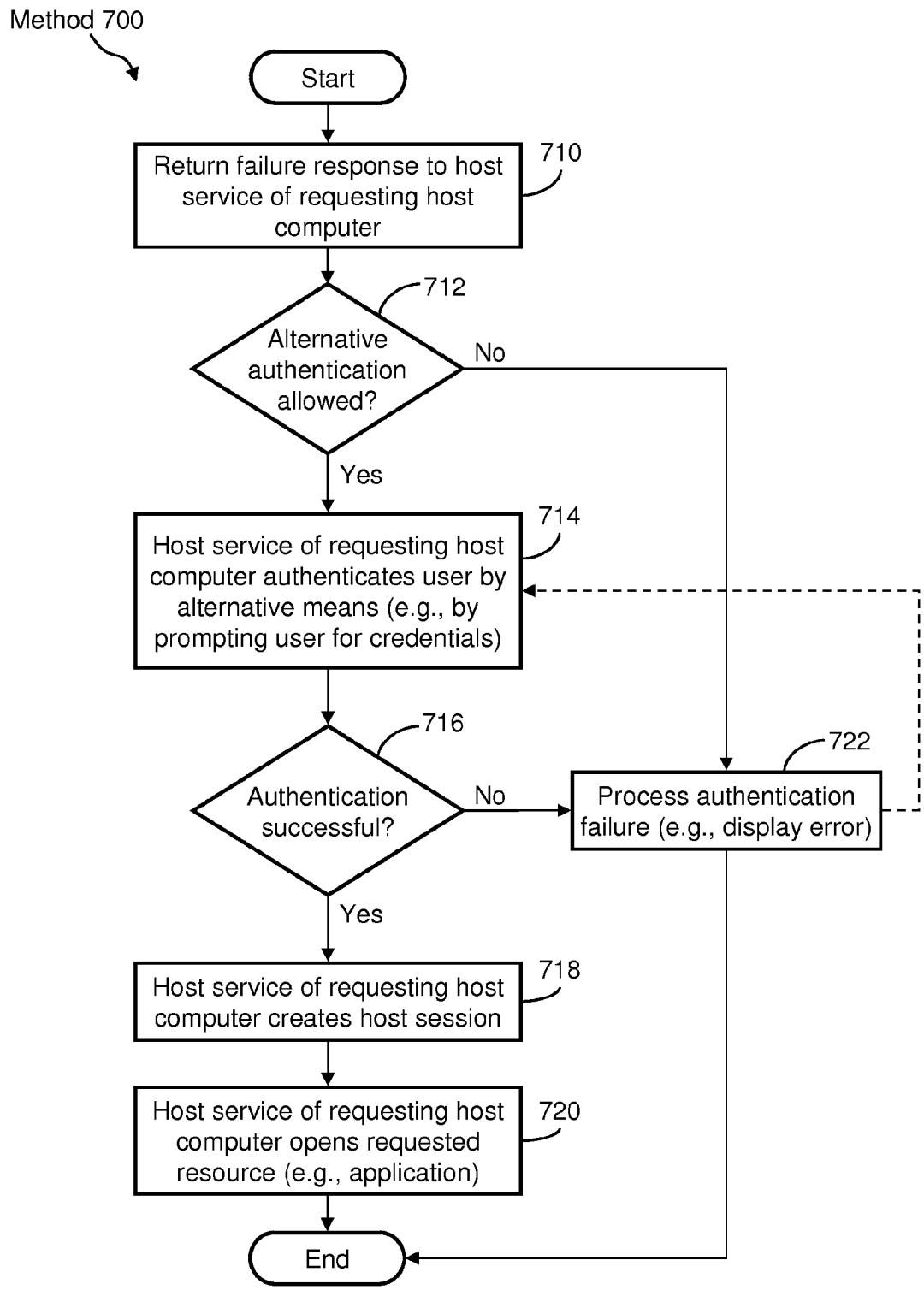
FIG. 7 illustrates a flow diagram of a method of processing a single sign-on (SSO) failure, according to the present disclosure.

At step 436, the SSO failure is processed according to a method 700 of FIG. 7, which is a method of processing a SSO failure.

Figure 5:
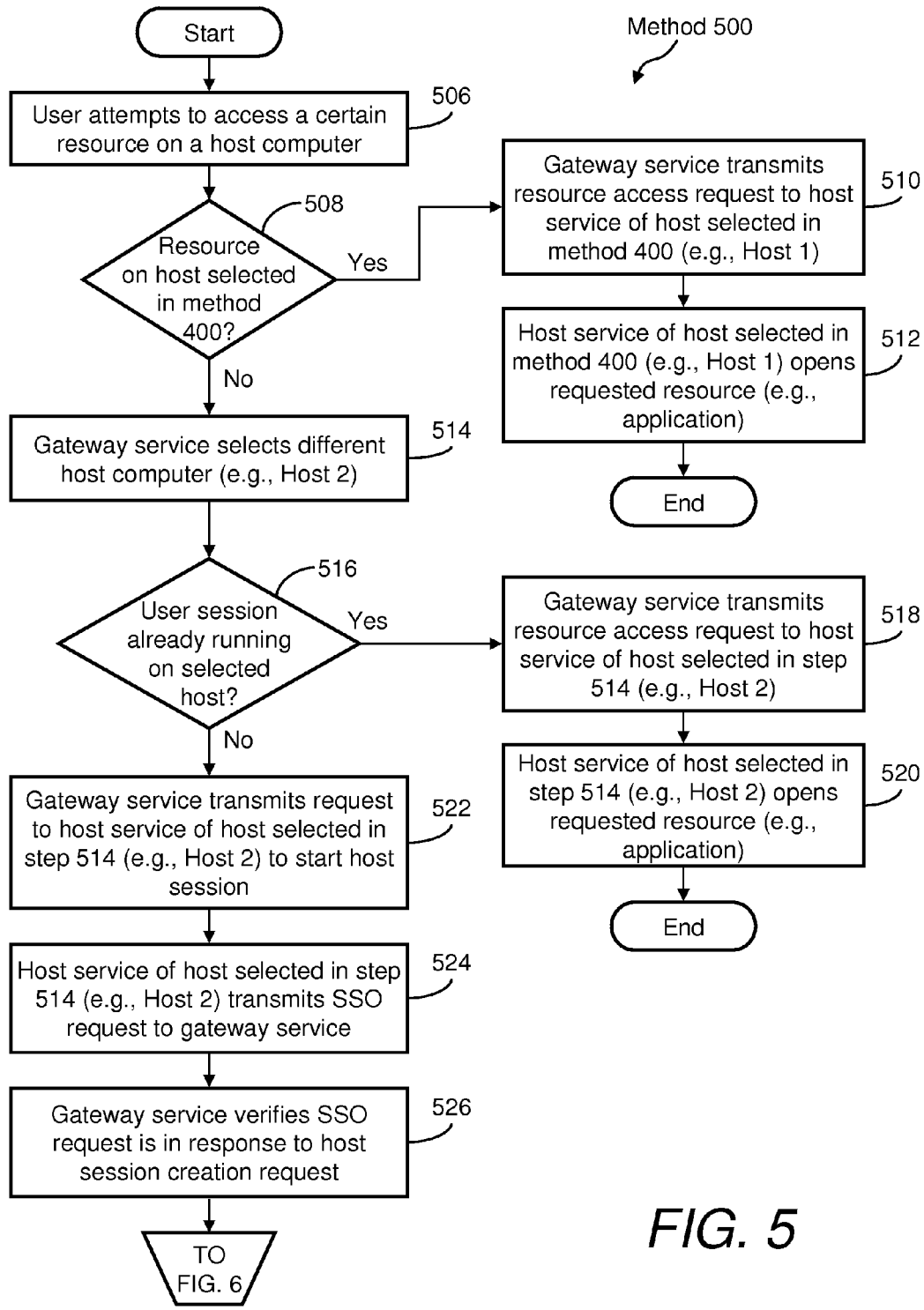
FIGS. 5 and 6 illustrate a flow diagram of a method of performing resource authentication without the need for a user to reenter his/her credentials, according to the present disclosure.
Figure 6:
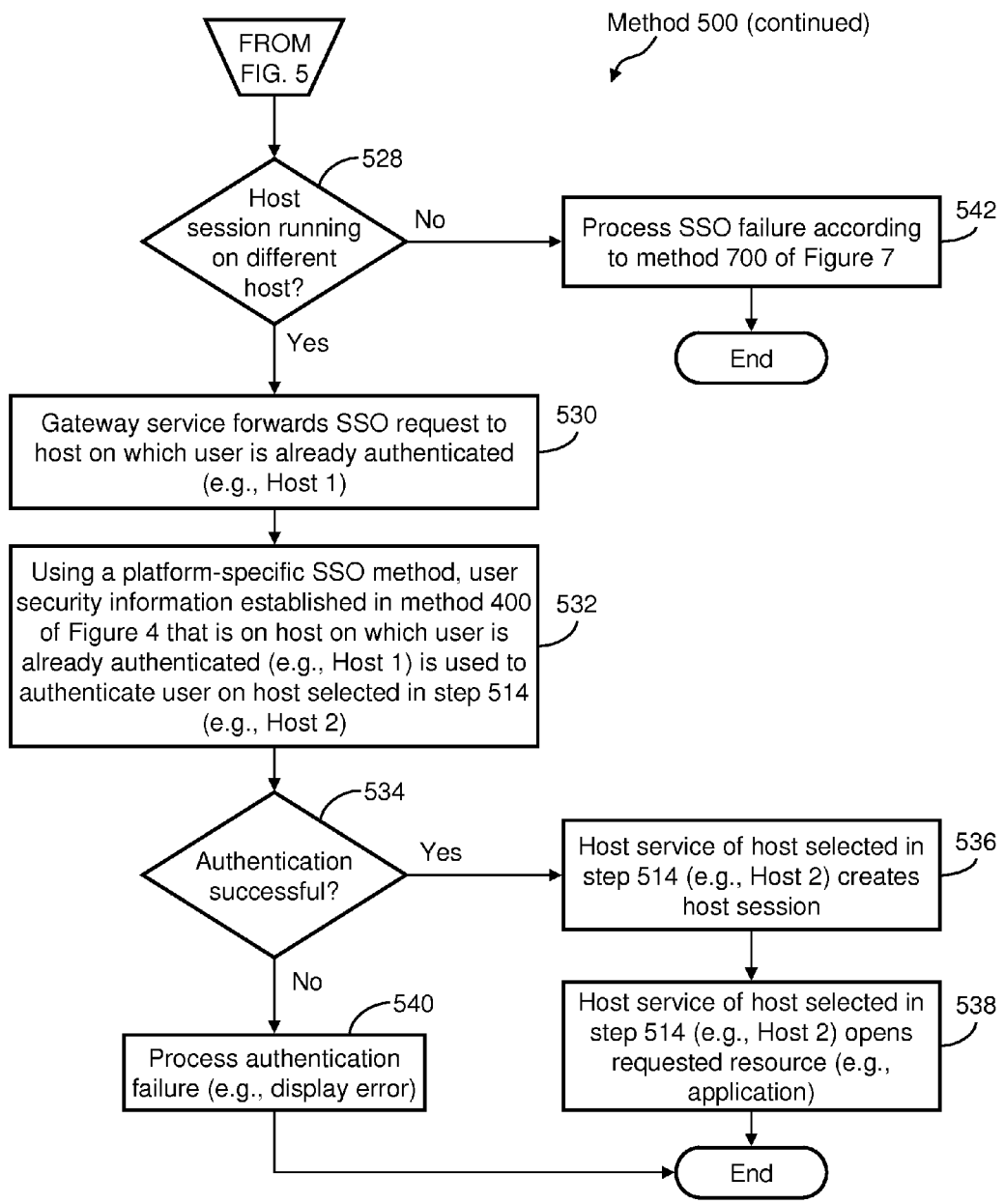

FIGS. 5 and 6 illustrate a flow diagram of a method 500 of performing resource authentication without the need for a user 150 to reenter his/her credentials, having entered them already in the computer cluster authentication process of method 400 of FIG. 4. Further, method 500 of performing resource authentication is iterated any time a user 150 accesses a host computer 100 that is different from the host computer 100 on which the user 150 already has a session. For example, if in the process of the user 150 accessing and/ viewing certain resources 112, the host computers 110-1, 110-2, and 110-3 are accessed, then method 400 iterates three times—once for host computer 110-1, once for host computer 110-2, and once for host computer 110-3; all without the need for the user 150 to reenter his/her credentials, having entered them already in the computer cluster authentication process of method 400 of FIG. 4. Method 500 may include, but is not limited to, the following steps.

At step 506, a user 150 attempts to access a certain resource 112 residing on one or more host computers 110. For example, once the user 150 is authenticated into computer cluster 105 using method 400 of FIG. 4, the user 150 is presented with a list of specific resources 112 (e.g., resources, applications, programs, processes, files, and/or data) to which he/she has access rights. From the list, the user 150 selects a certain resource 112. For example, the user 150 selects Microsoft® Word.

At decision step 508, gateway service 122 of gateway server 120 tracks the host computers 110 on which the certain resource 112, such as Microsoft® Word, exists. If the selected resource 112 is exists on more than one host computer 110, gateway service 122 first determines whether the selected resource 112 exists on the host computer 110 selected in step 422 of method 400 of FIG. 4, in which case a host session is already running on this host computer 110. For example, if host computer 110-1 is selected in step 422 of method 400 and the selected resource 112 exists on host computer 110-1, then method 500 proceeds to step 510. However, if host computer 110-1 is selected in step 422 of method 400 and the selected resource 112 does not exist on host computer 110-1, then method 500 proceeds to step 514.

At step 510, gateway service 122 of gateway server 120 transmits a resource access request to host service 116 of the host computer 110 that already has a host session running for the user 150. For example, if the user 150 already has a host session on host computer 110-1, then gateway service 122 transmits the request to access Microsoft® Word to host service 116 of host computer 110-1.

At step 512, host service 116 opens requested resource 112. Continuing the example, host service 116 of host computer 110-1 opens Microsoft® Word on host computer 110-1.

At step 514, gateway service 122 determines which other host computers 110 have the selected resource 112 (e.g., Microsoft® Word) and selects one of them. For example, gateway service 122 may select the host computer 110 that has the lowest CPU utilization. In one example, of the multiple computers 110 on which Microsoft® Word exists, host computer 110-2 has the lowest CPU utilization and, therefore, gateway service 122 selects host computer 110-2. Generally, users 150 only see resources 112 and do not know on which host computer 110 or host computers 110 a given resource exists. Optionally, the host computers 110 themselves can be published to users 150 and users 150 may select a certain resource 112 on a specific host computer 110.

At decision step 516, gateway service 122 of gateway server 120 determines whether a host session for the requesting user 150 is already running on the host computer 110 selected in step 514. For example, if host computer 110-2 is selected in step 514, gateway service 122 of gateway server 120 determines whether a host session for the requesting user 150 is already running on host computer 110-2. If a host session is already running on the selected host computer 110, method 500 proceeds to step 518. However, if a host session is not running on the selected host computer 110, method 500 proceeds to step 522.

At step 518, gateway service 122 of gateway server 120 transmits a resource access request to host service 116 of the host computer 110 selected in step 514. Continuing the example, gateway service 122 transmits the request to access Microsoft® Word to host service 116 of host computer 110-2.

At step 520, host service 116 of the host computer 110 selected in step 514 opens requested resource 112. Continuing the example, host service 116 of host computer 110-2 opens Microsoft® Word on host computer 110-2.

At step 522, gateway service 122 of gateway server 120 transmits the resource access request to host service 116 of the host computer 110 selected in step 514 to start a host session for the authenticated user 150. Continuing the example, to start a host session, gateway server 120 transmits a session creation request to host service 116 of host computer 110-2, which was selected in step 514. The session creation request includes the username (or account name), but does not include the password.

At step 524, host service 116 of the host computer 110 selected in step 514 transmits a SSO request back to gateway service 122 of gateway server 120. Continuing the example, host service 116 of host computer 110-2 transmits a SSO request back to gateway service 122 of gateway server 120.

At step 526, gateway service 122 of gateway server 120 verifies that the SSO request is in response to a valid host session creation request. For example, gateway service 122 may generate a universally unique identifier (UUID) for the new session and transmit the UUID to the host computer 110 selected in step 514. Continuing the example, gateway service 122 may require the host computer 110-2 to provide this UUID in the SSO request. Additionally, gateway service 122 may timestamp the UUID and only accept SSO requests for a given UUID that are received within a specified timeout period.

At step decision 528, gateway service 122 of gateway server 120 determines whether a host session for the authenticated user 150 is running on a host computer 110 other than the host computer 110 selected in step 514, for example, other than host computer 110-2. If yes, method 500 proceeds to step 530. However, if no, the SSO process has failed and method 500 may proceed to step 542.

At step 530, gateway service 122 forwards the SSO request to the host computer 110 on which the user 150 is already authenticated. For example, if in step 422 of method 400 the user 150 is already authenticated on host computer 110-1, gateway service 122 forwards the SSO request to host computer 110-1. The method of the disclosure uses the fact that the user 150 is already authenticated on one host computer 110 (e.g., host computer 110-1) to now authenticate the user 150 on a different host computer 110 (e.g., host computer 110-2) using, for example, a Security Support Provider Interface (SSPI) API.

At step 532, using a platform-specific SSO method, user security information established at step 428 of method 400 of FIG. 4 that is on the host computer 110 selected in step 422 of method 400 (e.g., host computer 110-1) is used to authenticate user 150 on the host computer 110 selected in step 514 (e.g., host computer 110-2). In one example, in a Windows environment, the SSO authentication process may use the SSPI function. During authentication, gateway service 122 relays challenges and responses between the host computer 110 on which the user is already authenticated (e.g., host computer 110-1 selected in step 422 of method 400) and the host computer 110 selected in step 514 (e.g., host computer 110-2).

At step decision 534, it is determined whether the resource authentication is successful. For example, the success or failure of the authentication may be depend on the whether any system errors have occurred, such as errors from the SSPI function, system communication errors, and the like, If errors are present, the authentication may fail. Another reason for failure may be the detection of an unauthorized user attempting to spoof the system. If the authentication is successful, then method 500 proceeds to step 536. However, if the authentication fails, then method 500 proceeds to step 546.

At step 536, host service 116 of the host computer 110 selected in step 514 (e.g., host computer 110-2) creates a host session for the authenticated user 150.

At step 538, host service 116 of the host computer 110 selected in step 514 (e.g., host computer 110-2) opens the requested resource 112 (e.g., an application, such as Microsoft® Word). The particular resource 112 is presented to the user 150 at client device 160 via gateway service 122 and client application 162.

At step 540, the authentication failure is processed. In one example, host service 116 of the host computer 110 selected in step 514 (e.g., host computer 110-2) and/or gateway service 122 notifies the user 150 of an error and method 500 ends.

At step 542, the SSO failure is processed according to a method 700 of FIG. 7, which is a method of processing a SSO failure.

FIG. 7 illustrates a flow diagram of a method 700 of processing a SSO failure. Method 700 may include, but is not limited to, the following steps.

At step 710, gateway service 122 returns a failure response to host service 116 of the requesting host computer 110.

At step 712, host service 116 of request host computer 110 determines (e.g., but checking an administrator-defined configuration file) if an alternative authentication method is allowed. If an alternative authentication method is allowed, method 700 proceeds to step 714. However, if an alternative authentication method is not allowed, then method 700 proceeds to step 722.

At step 714, host service 116 of the requesting host computer 110 authenticates the requesting user 150 by alternative means, such as by prompting user 150 to enter his/her credentials (e.g., username and password) or using credentials that have been cached from a previous session, and the like.

At step decision 716, it is determined whether the resource authentication is successful. For example, it is determined whether the requesting user 150 entered a correct or incorrect password. If the authentication is successful, then method 700 proceeds to step 718. However, if the authentication fails, then method 700 proceeds to step 722.

At step 718, host service 116 of the requesting host computer 110 creates a host session for the authenticated user 150.

At step 720, host service 116 of the requesting host computer 110 opens the requested resource 112 (e.g., an application, such as Microsoft® Word). The particular resource 112 is presented to the user 150 at client device 160 via client application 162.

At step 722, the authentication failure is processed. In one example, host service 116 of the requesting host computer 110 notifies the user 150 of an error and method 700 ends. Optimally, further attempts are made to authenticate the requesting user 150 by alternative means by returning to step 714.

Referring now to FIGS. 1 through 7, when a user 150 wishes to exit computer cluster 105 of client-server computing system 100, the user 150 signs out of gateway service 122 of gateway server 120. For example, using client application 162, which may be launched in a web browser on his/her client device 160, the user 150 selects certain logout controls (e.g., click on a logout button). In so doing, the connection to gateway server 120 of computer cluster 105 is closed. The user 150 may then close the web browser on his/her client device 160. Alternatively, the user's session times out and the connection to gateway server 120 of computer cluster 105 is automatically closed.

Once the user 150 signs out of gateway service 122 or the user's session times out, gateway service 122 of gateway server 120 deletes the user 150's host sessions on all host computers 110. Optionally, the user 150's host sessions may remain running so that the user 150 can reconnect to them at a later time.

Various embodiments of the present invention allow for the method disclosed herein to be performed by an intermediary device (e.g., a cloud server), which may be associated with the host computer or reside elsewhere in the network (e.g., in the cloud). For example, a host computer of this disclosure may receive a request from a requesting client device, forward to a cloud server device, receive responsive data and forward to the client device, or visa-versa.

The invention claimed is:

1. A method of providing single sign-on (SSO) capability in an application publishing environment, the method comprising:
   receiving, by a gateway service, an access request from a client application;
   prompting, by the gateway service, the client application, for credentials;
   authenticating, by the gateway service, the client application using the credentials;
   responsive to a successful authentication, selecting an initial host computer from a cluster of host computers;
   encrypting, by the gateway service, the credentials using a public key associated with the selected host computer;
   transmitting, by the gateway service, the encrypted credentials to the host computer;
   decrypting, by the host computer, the encrypted credentials;
   authenticating, by the host computer, the client application using the decrypted credentials; and
   responsive to a successful authentication on said host computer:
      starting, by the host computer, a host session for the client application, and
      automatically erasing the credentials from memory of the gateway service subsequent to the successful authentication on the host computer, wherein subsequent requests for access to another host computer in the cluster are forwarded from the gateway server to the host computer for authentication based on the credentials.

2. The method of claim 1, further comprising registering the host computer with the gateway server.

3. The method of claim 2, wherein registration includes the gateway service generating encryption keys for the host computer, the generated encryption keys including the public key associated with the host computer.

4. The method of claim 3, wherein the generated encryption keys further include a private key associated with the host computer.

5. The method of claim 4, wherein the encrypted credentials can only be decrypted with the private key associated with the host computer.

6. The method of claim 1, further comprising publishing a list of a plurality of available resources.

7. The method of claim 1, wherein another access request is received for a resource on another host computer.

8. The method of claim 7, wherein the gateway service forwards the request to the initially selected host computer.

9. The method of claim 8, wherein the authentication on the initially selected host computer is used to authenticate the request for the other host computer.

10. A system for providing single sign-on (SSO) capability in an application publishing environment, the system comprising:
    a cluster of one or more host computers;
    a gateway service that:
       receives an access request from a client application;
       prompts the client application, for credentials;
       authenticates the client application using the credentials;
       responsive to a successful authentication, selects an initial host computer from the cluster of one or more host computers;
       encrypts the credentials using a public key associated with the selected host computer;
       transmits the encrypted credentials to the host computer;
    wherein the host computer:
       decrypts the encrypted credentials;
       authenticates the client application using the decrypted credentials; and
       responsive to a successful authentication by the host computer:
          starts a host session for the client application
          automatically erases the credentials from memory of the gateway service subsequent to the successful authentication on the host computer, wherein subsequent requests for access to another host computer in the cluster are forwarded from the gateway server to the host computer for authentication based on the credentials.

11. The system of claim 10, wherein the gateway service registers each of the host computers.

12. The system of claim 11, wherein registration includes the gateway service generating encryption keys for the host computer, the generated encryption keys including the public key associated with the host computer.

13. The system of claim 12, wherein the generated encryption keys further include a private key associated with the host computer.

14. The system of claim 13, wherein the encrypted credentials can only be decrypted with the private key associated with the host computer.

15. The system of claim 10, wherein the host computers publish a list of a plurality of available resources.

16. The system of claim 1, wherein the gateway service receives another access request is received for a resource on another host computer of the one or more host computers.

17. The system of claim 16, wherein the gateway service forwards the request to the initially selected host computer.

18. The system of claim 17, wherein the authentication on the initially selected host computer is used to authenticate the request for the other host computer.

19. A non-transitory computer-readable storage medium, having embodied thereon a program executable by a processor to perform a method for providing single sign-on (SSO) capability in an application publishing environment, the method comprising:

receiving an access request from a client application;

prompting the client application, for credentials;

authenticating the client application using the credentials;

responsive to a successful authentication, selecting an initial host computer from a cluster of host computers;

encrypting, by the gateway service, the credentials using a public key associated with the selected host computer;

transmitting the encrypted credentials to the host computer;

decrypting, by the host computer, the encrypted credentials;

authenticating, by the host computer, the client application using the decrypted credentials; and responsive to a successful authentication by the host computer:

starting, by the host computer, a host session for the client application, and automatically erasing the credentials from memory of the gateway service subsequent to the successful authentication on the host computer, wherein subsequent requests for access to another host computer in the cluster are forwarded from the gateway server to the host computer for authentication based on the credentials.

\* \* \* \* \*